(No Model.) 2 Sheets—Sheet 1.
J. F. W. NEITZEL.
SEED PLANTER.
No. 293,666. Patented Feb. 19, 1884.
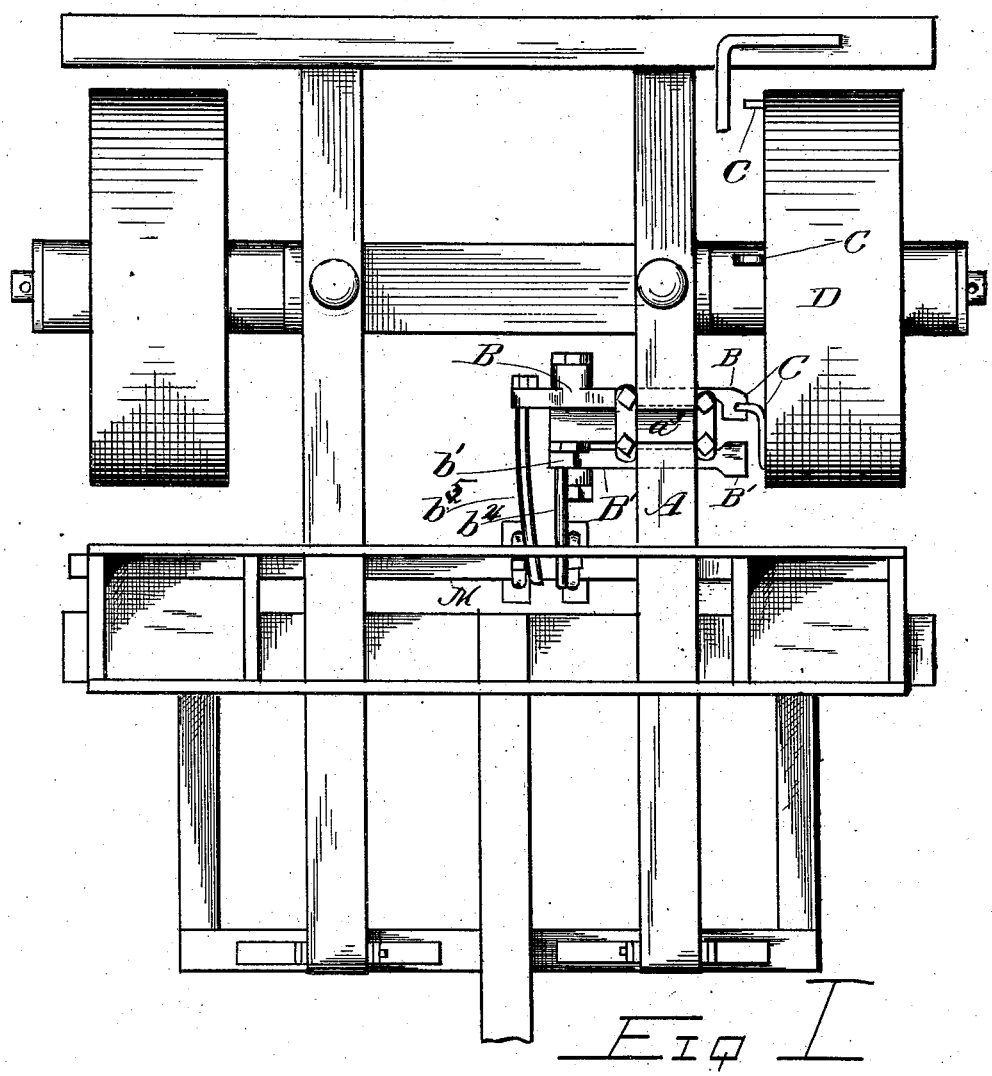
Fig. I
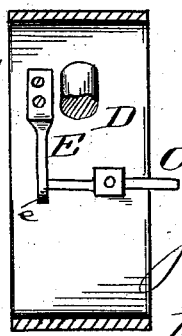
Fig. 2
Witnesses
Wm Duvall
H. Bernhard
Inventor:
John F. W. Neitzel
per Edson Bro's
Attys.

(No Model.) 2 Sheets—Sheet 2.

J. F. W. NEITZEL.
SEED PLANTER.

No. 293,666. Patented Feb. 19, 1884.

Witnesses:
Wm S Duvall
H Bernhard

Inventor:
John F. W. Neitzel
per Edson Bro's
Atty's.

UNITED STATES PATENT OFFICE.

JOHN F. W. NEITZEL, OF ARAGO, NEBRASKA.

SEED-PLANTER.

SPECIFICATION forming part of Letters Patent No. 293,666, dated February 19, 1884.

Application filed July 19, 1883. (No model.)

*To all whom it may concern:*

Be it known that I, JOHN F. W. NEITZEL, a citizen of the United States, residing at Arago, in the county of Richardson and State of Nebraska, have invented certain new and useful Improvements in Seed-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to corn-planters and the like; and the novelty consists in the construction, arrangement, and adaptation of parts, as will be more fully hereinafter set forth, and specifically pointed out in the claims.
The invention is fully illustrated in the accompanying drawings, which form a part of this specification, and in which—

Figure 3:
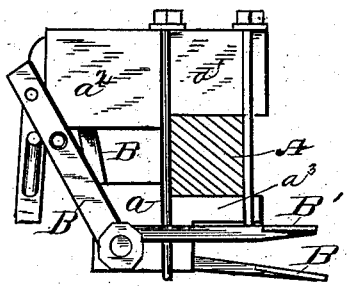
Figure 4:
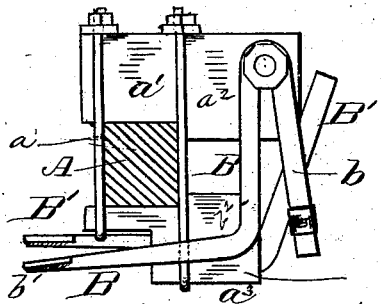

Figure 1 is a top plan view of the machine, and Figs. 2, 3, and 4 are detail views of portions of the same.

The object of the invention is to produce a planter which shall operate the feed-bar in the seed-boxes to drop the seed or grain regularly by the action of duplex levers, which receive their force from lugs upon one of the riding-wheels. These levers operate alternately, and the lugs are pivoted to the inner surface of the wheel and may be turned on their pivots and housed within the wheel when desired, as in transporting the machine from one field to another and the like.

Referring to the drawings, in which similar letters of reference indicate like parts in all the figures, A designates the main frame of the machine, upon one of the longitudinal bars of which is secured the block $a'$, having projection $a^2$, by means of the clips $a$. These clips $a$ also secure upon the under side of said bar the block $a^3$.
Pivoted to the block $a^2$ is a bell-crank lever, B, having a trip-plate, $b'$, and an upward extension, $b^2$, provided with a right-angled arm, $b^5$. This arm $b^2$ is adapted to strike a lug on the feed-bar M, and force it in one direction as it is moved by the pivoted lugs C upon the inner surface of the wheel D.

Upon the block $a^3$ is pivoted the bell-crank lever B', having the arm $b^4$, and this arm operates similarly upon a lug on the feed-bar M to force the same in an opposite direction from that imparted by the lever B. It will be observed that the arrangement of these levers B and B', pivoted above and below upon opposite sides of the blocks, gives to the feed-bar reverse motions, although the wheel travels in the same direction, and I consider it an important feature of the invention.

The seed-boxes, ports, and feed-bar are of ordinary construction, and need not be further described in this specification. The lugs C are pivoted upon the inner surface of the wheel, each by a single screw and nut, and to prevent their turning by the force of their contact with trip-levers B and B', I provide a spring, E, having a hook, $e$, which hook engages the rear end of said lugs or levers and holds them against such displacement. By loosening the nut and disengaging the spring the lugs or levers C may be turned in on their pivots and no portion be exposed beyond the edge of the rim of the wheel.

It will be observed that alternate lugs C are bent so as to impinge upon the lever B, while the others are straight, so as to impinge upon the lever B'.

What I claim as new is—

1. In combination with the main frame, the blocks $a'$ $a^2$ $a^3$ and the clips $a$, the lever B, pivoted below upon one side of the block $a^2$, and having upward extension $b$, trip $b'$, and arm $b^5$, the lever B', having arm $b^4$, and pivoted above upon the opposite side of the block $a^3$, and the pivoted lugs or levers C, adapted to impinge alternately upon said levers, as set forth.

2. The pivoted lugs or levers C, each alternate one being bent to project inward, and the hooked springs E, combined with the trip-levers B and B', arranged as shown, and with the feed-bar M, all adapted to serve as and for the purposes set forth.

In testimony whereof I affix my signature in presence of two witnesses.

JOHN F. W. NEITZEL.

Witnesses:
C. T. BURCHARD,
JOSEPH KITT.